Sept. 22, 1953  R. D. PIKE  2,653,088
DIRECT PRODUCTION OF STEEL FROM OXIDES OF IRON
Filed Aug. 9, 1951
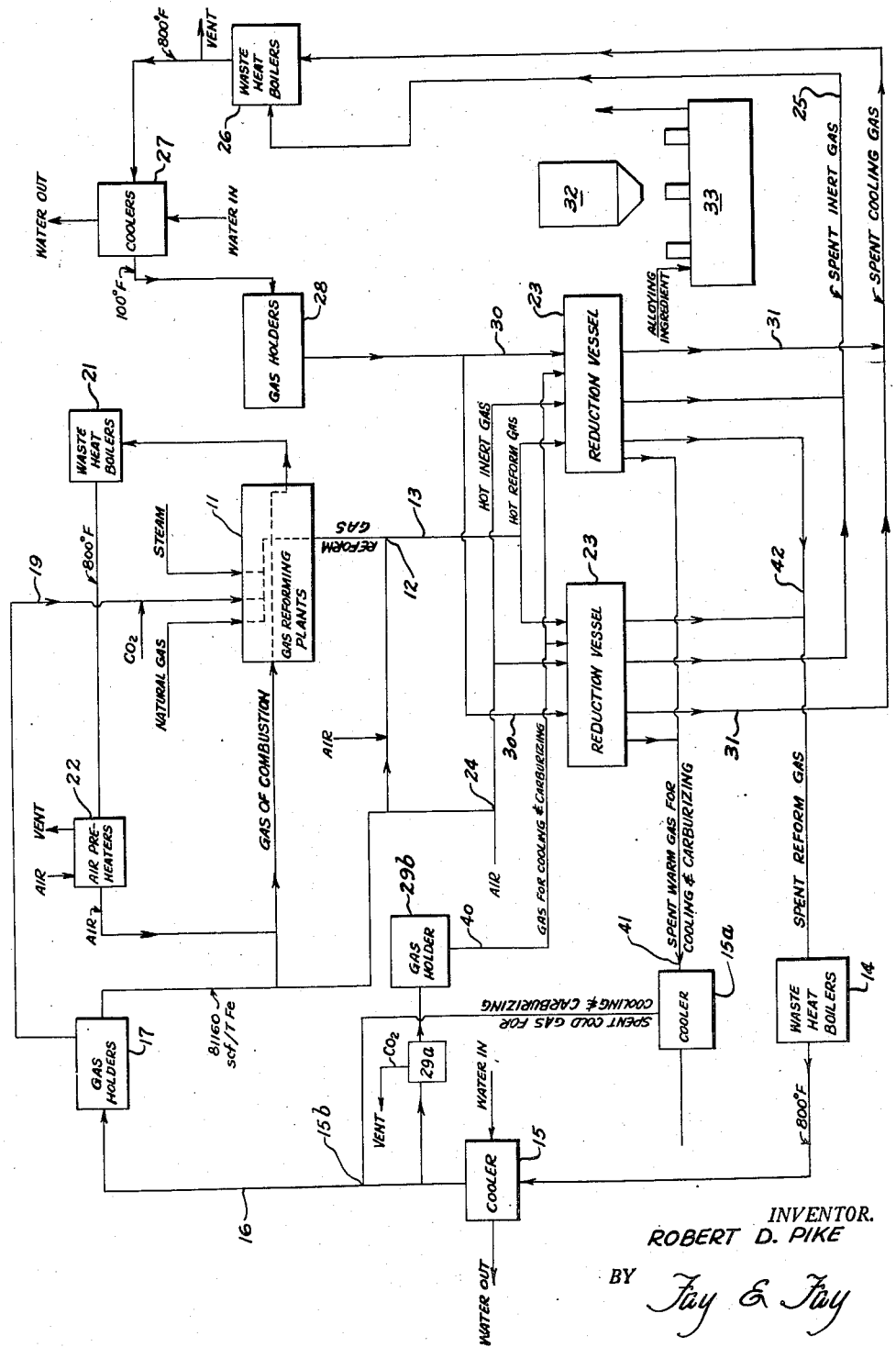
INVENTOR.
ROBERT D. PIKE
BY
*Fay & Fay*
ATTORNEYS Patented Sept. 22, 1953

2,653,088

UNITED STATES PATENT OFFICE 2,653,088

DIRECT PRODUCTION OF STEEL FROM OXIDES OF IRON

Robert D. Pike, Greenwich, Conn.

Application August 9, 1951, Serial No. 241,051

8 Claims. (Cl. 75—38)

This invention relating as indicated to the production of steel in an electric arc or other suitable type of steel making step, from carburized iron produced by gaseous reduction of iron oxide, is more particularly directed to a method of making carburized, partially reduced, discrete particles of metallic iron, for subsequent use in the making of steel in a furnace of the electric arc type.

The present invention is an improvement of my prior patent in the United States, No. 2,501,189, issued March 21, 1950, entitled, "Production of Metallic Iron from Iron Oxides," but carries the invention of that earlier patent, further in that the reduced iron with its relatively small content of unreduced iron, will be cooled in the presence of reducing gas containing CO, below 1000° F. to form carbon in the mass while cooling in order to enable this carbon to act as a reducing and non-oxidizing agent for the residual iron oxide remaining after gaseous reduction, during the subsequent melting in the electric arc furnace or other suitable step for melting and steel making. In addition, this invention is an improvement of the process described in "Pilot-Plant Production of Steel from Sponge Iron," Bureau of Mines Report of Investigations 4498, August 1949, wherein certain tests were made on a variety of sponge irons, using various ores and methods to produce steel of commercial grades. In that report it was found that an improvement in the melting characteristics of briquetted sponge iron could be achievd by mixing with the iron certain amounts of carbon and in some cases, lime. Under these conditions, the sponge iron pellets, or briquettes, were found to be somewhat softer and more easily broken than those made without the addition of carbon, but they melted down very rapidly in the electric arc furnace with no tendency to stick together, or bridge-over in the furnace.

My present invention may employ similar equipment and some of the process steps of my earlier patent, 2,501,189, though somewhat modified, and in addition, deposits carbon from the cool reducing gas containing CO by cooling the charge with it below 1000° F. At and below this temperature, the carbon deposits according to the formula $$2CO \rightarrow CO_2 + C$$
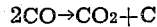

This reaction is catalyzed by the unreduced iron oxide which is present with the reduced iron.

When sufficient carbon has been deposited, other inert gases may be employed for cooling, which will not deposit carbon in the above manner, nor will they re-oxidize the iron which has already been introduced. This charge of discrete particles of carburized, partially reduced, metallic iron is subsequently heated, preferably in the electric furnace, using any desired alloying ingredients, to produce a superior quality of electric furnace steel.

Certain of the gases, principally CO, arising from the substantially complete reduction of the iron oxide in the discrete particles in the steel making step, may be recirculated into the reducing gas used for initial reduction of the iron oxide, to increase its content of CO, as will be further described, and thus to modify the ratio of the CO in the reducing gas to the hydrogen content of such gas, making the net result of the reaction of reduction more exothermic, thereby tending to prevent lowering of temperature during reduction.

This present proposal is particularly applicable for the making of steel where natural gas and iron ore are in close proximity to each other. An example of this might be the making of steel from the iron ores of the Mesabi Range with the natural gas from Alberta, Canada, though other sources of gas could, of course, be used. As a substitute for the iron ore of the Mesabi Range, pelletized taconite concentrates form a suitable feed for my reduction and steel making process. As a still further example, this process could be used in connection with the iron ores of Venezuela and the sulphur and nitrogen-free natural gas from the Anaco area of that country.

It is accordingly an object of my present invention to produce steel directly from iron ores, such as magnetite or hematite, in a gaseous reduction process without fusion, followed by depositing carbon in the partially reduced ore, and then effecting a further substantially complete reduction with fusion in a steel making step.

It is a further object of my invention to reduce the fuel and power requirements for making steel and the costs incident thereto, by employing a reducing gas, preferably made by reforming natural gas, in the direct reduction of iron ore, followed by melting to make steel.

It is a further object of my invention to make possible the economical recovery of metals from isolated deposits of iron ore in those parts of the world wherein coal is not readily available but where large quantities of natural gas are available.

It is a further object of my invention to reduce iron with any suitable reducing gas, such as coke-oven gas, and to produce steel directly from such partially reduced iron ore and deposited carbon in an electric furnace or other type of steel making step.

It is a further object of my invention to substitute natural gas for coke in the production of steel from iron ore.

Other objects and advantages will become apparent hereinafter when the following specification is read in conjunction with the accompanying drawing.

Fig. 1 represents a simplified flow diagram of the process covered by my present invention.

In its simplest form, my invention contemplates the provision of an iron oxide burden of discrete particles on a downdraft hearth 23, of which a sufficient number are provided to allow the continuous flow of the hot reducing reformed gas through the bed. These hearths 23, have provisions for conducting the products of combustion and reduction to another part of the system, where the spent reduction reformed gas may be replenished for reuse or used as gas for combustion. At the outset, the burden in the hearth 23 is preheated by the introduction of gas of combustion and air, preferably in substantially theoretically correct mixture for complete combustion, and, after it attains a temperature for reduction, but below the fusion temperature of the burden, the gas of combustion and air are turned off and the reformed reducing gas, composed principally of hydrogen and carbon monoxide, is admitted. This gas is conducted downwardly through the charge in which the hydrogen and carbon monoxide combine with the oxygen of the iron oxide to form water and carbon dioxide. A part of the spent reformed reducing gas is conducted to a dehumidifying and decarbonating system, preferably of the amine type 29a, after being cooled in cooler 15. This portion of the circulating gas, after leaving 29a, has been restored to its original reducing power and is cold. It goes to the gas holder 29b, from whence it is withdrawn as needed in line 40 to initially cool and deposit carbon in the pellets, that is to carburize. These same pellets earlier have been reduced in reduction vessels 23, except for a small residual amount of iron oxide. The spent warm reducing gas issuing from the bottom of reduction vessels 23 in line 41, is cooled in cooler 15a and thence joins the main circulating stream of spent reformed reduction gas flowing in the line 16 at a point roughly corresponding to 15b after the main stream gas has passed through cooler 15. From this point the entire flow of spent reformed reducing gas flows through line 16 into gas holder 17, from which it is withdrawn as needed in the balance of the circulation.

The main flow of spent reformed reducing gas leaving reduction vessels 23 in line 42 during the period when the iron oxide is being reduced, is at an average temperature of about 1825° F. and it is economically advisable to pass this gas through waste heat boilers 14, thus reducing the temperature to about 800° F. before entering the cooler 15, where the gas is brought into contact with cold water and the temperature reduced to about 100° F., thus dehumidifying the gas and also removing some $CO_2$. The $CO_2$ gathered from the amine system 29a, is usefully employed in circulation in gas reforming plants 11, as will be presently described.

A part of the spent reformed reducing gas stored in gas holder 17, goes directly to gas reforming plants 11, via line 19, where it joins with the necessary amount of fresh natural gas, steam and the $CO_2$ just mentioned, to form reformed natural gas. Another portion of the gas from holder 17 is burned with the preheated air at about 500° from preheater 22 furnishing the products of combustion which supply the heat for carrying out the gas reforming reaction. Another portion of the gas from holder 17 is fired with air, furnishing gas of combustion which is mixed directly at 12 with the reformed gas which leaves 11 at about 1472° F., thus raising the temperature of the mixture of the reformed gas and the gas of combustion, to about 1650° F.

The balance of the gas from holder 17 is mixed with air at 24 and the theoretical mixture for combustion, containing substantially no surplus $O_2$, is fired in one of the vessels 23 in which the iron oxide is being heated up to reduction temperature. This temperature is preferably to about 2000° F. as a maximum at top of the bed to compensate for the fact that the mixed reformed gas is introduced during the reduction cycle at about 1650° F.

The spent inert gas issuing from that one of the reduction vessels 23 in which the iron oxide is being heated preparatory to reduction, passes through line 25 at an average temperature of about 1260° F. and together with the similar gas used for cooling the reduced iron oxide, passes through waste heat boilers 26, thence through water coolers 27, where the temperature is reduced from about 800° F. to about 100° F. and thence goes to gas holder 28, whence it is supplied as needed through line 30 to that one of the vessels 23 in which final cooling of the reduced iron oxide is being carried out after preliminary cooling and carburizing by the cold reducing gas from holder 29b. When so cooled, the reduced iron oxide may be removed from the reduction vessel 23 and exposed to the atmosphere without re-oxidation. Complete cooling may be carried out by using the gas from holder 29b, but it is more economical to use only so much of this gas for cooling that will deposit the desired carbon, completing the cooling with gas from holder 28.

A portion of the gas of combustion from line 25 may be recirculated to 24 to suitably reduce the temperature of combustion, in order to avoid local overheating of the charge in vessels 23.

The iron oxide thus reduced in reduction vessels 23, has had about 90% of its Fe reduced to the metallic state, and has had deposited in it and on it, enough carbon to prevent oxidation in the electric furnace and to effect reduction of the iron oxide present, forming steel. This partially reduced and carburized metal now is placed in bin 32, whence it is supplied to electric furnace 33 where it is melted for substantially complete reduction of the iron oxide and where any desired alloying ingredients may be added. CO produced by reduction of iron oxide with carbon in the electric furnace may be introduced into the main circulation of the mixed reformed reducing gas at 13. This will slightly increase the percentage of CO in the latter, over that shown in Fig. 1, thereby somewhat increasing the exothermic reaction of reduction in the vessels 23.

After removing the partially reduced iron oxide from the reduction vessel 23, which may be accomplished as in my United States Patent, 2,501,189, or otherwise by lifting the entire top of the vessel with a crane and then shoving the reduced and semi-sintered charge aside with a bulldozer, or other suitable equipment, the vessel is filled with fresh iron oxide and returned to its original starting condition, ready for heating up.

I prefer to have available, seven reduction vessels 23, of which one is a spare, so as to at all times have a continuous stream of hot reform reducing gas circulating in the system. Each of these vessels may be proportioned in size so as to produce 45 tons metallic iron per cycle, so that the total production from six vessels per cycle is, 6×45=270 tons, from which it may be inferred that the productive cycle of each pan is 6½ hours, if the output is to be 1,000 tons metallic Fe daily, that is, $$\frac{24}{6.5} \times 270 = 1000.$$

*Example.*—In citing this example, for convenience a start will be made at 13, which is the mixed reformed hot reducing gas at 1650° F., which enters that one of the vessels 23 which is under reduction. The make-up of this gas follows:

TABLE 1
*Analysis of gas at 13*

Constituent:
| | |
|---|---:|
| $CO_2$ _____percent volume__ | 3.7 |
| CO _____do____ | 19.8 |
| $H_2$ _____do____ | 57.1 |
| $N_2$ _____do____ | 5.6 |
| $H_2O$ _____do____ | 13.8 |
| S. c. f.[1] gas per ton metallic Fe, produced by gaseous reduction_____ | 179,000 |

[1] Standard cubic feet, s. c. f. at 60° F. and sea level.

The spent reformed gas at an average temperature of 1825° F. leaving the vessel 23, has the following analysis:

TABLE 2
*Spent reformed gas*

Constituent:
| | |
|---|---:|
| $CO_2$ _____percent volume__ | 6.00 |
| CO _____do____ | 17.55 |
| $H_2$ _____do____ | 49.2 |
| $N_2$ _____do____ | 5.60 |
| $H_2O$ _____do____ | 21.7 |
| S. c. f./ton metallic Fe_____ | 179,000 |

The following is the analysis of the gas diverted from the main circulation and passed through the amine system 29a:

TABLE 3

Constituent:
| | |
|---|---:|
| $CO_2$ _____percent volume__ | 7.67 |
| CO _____do____ | 22.4 |
| $H_2$ _____do____ | 62.8 |
| $N_2$ _____do____ | 7.16 |
| S. c. f./ton Fe_____ | 60,700 |

The analysis of the gas after being treated by the amine step at 29a, which goes to the gas holder 29b, whence it is withdrawn through line 40 to cool and carburize hot reduced iron oxide, is as follows:

TABLE 4

Constituent:
| | |
|---|---:|
| CO _____percent volume__ | 24.2 |
| $H_2$ _____do____ | 68.0 |
| $N_2$ _____do____ | 7.8 |

The analysis of the same gas, after passing through the hot, partially reduced iron oxide, is as follows:

TABLE 5

Constituent:
| | |
|---|---:|
| $CO_2$ _____percent volume__ | 4.0 |
| CO _____do____ | 17.2 |
| $H_2$ _____do____ | 70.8 |
| $N_2$ _____do____ | 8.0 |
| S. c. f./ton Fe_____ | 54,000 |

This latter gas rejoins the main stream at 15b and thence goes through line 16 into gas holder 17. Its analysis is given in the following table:

TABLE 6

Constituent:
| | |
|---|---:|
| $CO_2$ _____percent volume__ | 6.19 |
| CO _____do____ | 20.25 |
| $H_2$ _____do____ | 66.00 |
| $N_2$ _____do____ | 7.56 |
| S. c. f./ton Fe_____ | 133,760 |

The surplus gas from the gas holder 17 remaining after all requirements of combustion have been satisfied, amounts to 52,600 s. c. f./ton Fe. This gas goes directly to the gas reforming plant, where it is joined by 20,900 s. c. f./ton Fe of natural gas, of the analysis given in the following table:

TABLE 7
*Analysis of natural gas*

Constituent:                  Per cent volume
| | |
|---|---:|
| $CH_4$ _____ | 78.8 |
| $C_2H_6$ _____ | 12.0 |
| $N_2$ _____ | 7.0 |
| $CO_2$ _____ | 2.2 |

The analysis of the gas issuing from the gas reforming plants 11, is given in the following table:

TABLE 8

Constituent:
| | |
|---|---:|
| $CO_2$ _____Per cent volume__ | 3.2 |
| CO _____do____ | 21.2 |
| $H_2$ _____do____ | 61.1 |
| $N_2$ _____do____ | 1.4 |
| $H_2O$ _____do____ | 13.1 |
| S. c. f./ton Fe _____ | 167,000 |

This gas is mixed with hot gas of combustion, giving the analysis of mixed reformed reducing gas with which this example started.

The analysis of the gas in the inert gas circuit, used for cooling, is given in the following table:

TABLE 9

Constituent:                  Per cent volume
| | |
|---|---:|
| $CO_2$ _____ | 12.0 |
| $N_2$ _____ | 64.4 |
| $H_2O$ _____ | 23.6 |

This gas is inert to the reduced iron in the vessels 23, after the same has been precooled with the cold reducing gas from the gas holder 29b. In the following table is given a résumé of the gas flows expressed as S. c. f. (standard cubic feet) per ton metallic iron produced by gaseous reduction:

TABLE 10

| Item | S. c. f./ton |
|---|---:|
| Natural Gas_____ | 20,900 |
| Reformed Gas_____ | 167,000 |
| Mixed Reformed Gas_____ | 179,000 |
| Mixed Spent Reformed Gas, Hot_____ | 179,000 |
| Same, Cold_____ | 140,260 |
| Gas to amine system 29a_____ | 60,700 |
| Gas for combustion to gas holder 17_____ | 133,760 |
| Surplus of same after satisfying needs of combustion__ | 52,600 |

The heat balance of the operation is given in the following table, in which table the debit item for heat in the natural gas is given as though there were no surplus of circulating gas of combustion and this latter enters into the balance as the first credit item:

TABLE 11

| Debit items: | B.t.u. per ton Fe |
|---|---|
| Heat in natural gas | 31,300,000 |
| Exothermic heat of reduction of Fe₂O₃ | 46,000 |
| Exothermic heat of reaction, 2CO→CO₂+C | 754,000 |
| Total debit items | 32,100,000 |

| Credit items: | |
|---|---|
| Surplus gas for combustion | 12,640,000 |
| Surplus waste heat steam | 8,860,000 |
| Heat of the reforming reaction, by difference | 3,430,000 |
| Sensible heat, gas of combustion | 994,000 |
| Sensible heat extracted by the cooling water from the spent cooling gas | 2,090,000 |
| Sensible heat extracted by the cooling water from spent mixed reformed gas in cooler 15 | 3,680,000 |
| Total credit items | 32,100,000 |

From this table it may be stated that the net requirements of B. t. u. in the natural gas are 18,660,000 per ton Fe. In view of the very low cost of natural gas in many localities, this reduces the cost of fuel to a very small item.

The circulation of reducing gas for cooling and carburizing from the gas holder 29b through the reduced iron oxide in the vessels 23, may be looked upon as a closed circuit which is superimposed upon the major circulation of gas, and in this closed circuit, because of the action of the amine system 29a, the gas is fully reduced to its original reformed condition and then after passing through the iron oxide for cooling and carburizing, returns to the main circulation at 15b. This has an important effect in increasing the average reducing power of the main circulation of gas. The latter recirculates into the gas reforming plants 11, but about 60% of it is used for combustion purposes, the gases of combustion finally being discarded through vents. This acts as a "bleed" from the circulation, and prevents any substantial pick-up in the concentration of nitrogen and other inert gases of the atmosphere.

If the CO gas from the electric furnace 33 is not returned to the circulation, the exothermic heat of the reaction in vessels 23 is about 46,000 B. t. u. per ton Fe. If the CO from the electric furnace is returned to the circulation, preferably at 13, into the mixed reformed reducing gas, the exothermic heat of the reaction in the vessels 23 will be increased to about 64,000 B. t. u. per ton Fe.

I claim:

1. The process of reducing iron oxide without fusion combined with the making of steel from the reduced oxide, which comprises passing a hot reducing gas substantially free of hydrocarbon containing endothermic and exothermic components, the latter being CO, through the oxide at a temperature between 1650-2000° F. to reduce the greater part of it to metallic iron by gaseous reduction, cooling the oxide thus reduced with similar relatively cool reducing gas by the reaction 2CO=CO₂+C, to deposit sufficient carbon for reducing the unreduced oxide; then completing cooling under non-oxidizing conditions, and substantially finishing the reduction of said oxide in a steelmaking step, with the production of steel.

2. The process of reducing iron oxide without fusion and the further reduction of said oxide in a steelmaking step for the production of steel, which comprises heating said oxide to a temperature lower than its melting temperature, passing a hot reducing gas at a temperature between 1650-2000° F. containing endothermic and exothermic components, the latter being CO, substantially free from hydrocarbons, through a bed of particles of the oxide to reduce the greater part of the oxide by gaseous reduction while maintaining the ratio of the endothermic and exothermic components of the reducing gases so that the step of reduction is exothermic, cooling said reduced oxide with a similar relatively cool reducing gas to deposit sufficient carbon in the mass by the reaction of 2CO=CO₂+C for the subsequent reduction in the steelmaking step, and then completing the cooling under non-oxidizing conditions, and lastly reducing the residual iron oxide with the deposited carbon while adding the necessary alloying ingredients in the steelmaking step to produce steel.

3. The process of reducing iron ore without fusion combined with the making of steel from the reduced oxide which comprises the following steps: Heating the oxide to a temperature suitable for rapid gaseous reduction without fusion, passing the reducing gas, substantially free from hydrocarbons, at a temperature between 1650-2000° F. through the bed to reduce a major portion of it to metallic iron, said reducing gas containing exothermic and endothermic components, including CO as part of the exothermic gas and H₂ as a part of the endothermic gas, maintaining the ratio of the CO and H₂ in the gas so that the exothermic heat of reduction by CO will exceed that of the endothermic heat of reduction by H₂, cooling the reduced oxide with relatively cool reducing gas similar to said hot reducing gas, being substantially free from CO₂ at the point of introduction to carburize and partially cool, further cooling with cooling gas of combustion, and melting said oxide with the said deposited carbon in a steelmaking step to produce steel.

4. The process of reducing iron oxide without fusion and the further reduction and melting of said oxide in a steelmaking step, which comprises placing the oxide in a gas permeable bed upon a gas permeable support in a container, and carrying out the several steps necessary for reduction and for placing the reduced metal in a relatively cool condition, suitable for exposure to the air, separately and serially carrying out the following steps without movement of the charge except in the last step for steelmaking; first, heating by downdraft passage through the bed with gas of combustion to a temperature suitable for rapid gaseous reduction, diverting a portion of this gas after passing through the bed for use in the subsequent cooling step; second, passing a hot reducing gas at a temperature between 1650-2000° F. through the bed to effect reduction of the major portion of the oxide by gaseous reduction without fusion, said hot reducing gas containing endothermic and exothermic components, the latter being CO; third, passing relatively cool reducing gas through the bed to cool it and to deposit sufficient carbon for subsequent substantially complete reduction of the remaining unreduced oxide in a steelmaking step by the reaction 2CO=CO₂+C; fourth, completing the cooling under non-oxidizing conditions by passing aforesaid unheated gas of combustion through the bed; fifth, placing the reduced charge in a steelmaking step and replacing the charge with a fresh charge of oxide for repetition of the steps; and sixth, completing the reduction of the ore in a steelmaking step and drawing off the molten steel.

5. The process of reducing iron oxide without fusion which comprises passing a hot reducing gas substantially free of hydrocarbon containing endothermic and exothermic components, the latter being CO, through the oxide at a temperature between 1650–2000° F. to reduce the greater part of it to metallic iron by gaseous reduction, cooling the oxide thus reduced with similar relatively cool reducing gas by the reaction $$2CO = CO_2 + C$$

to deposit sufficient carbon for reducing the unreduced oxide; then completing cooling under non-oxidizing conditions.

6. The process of reducing iron oxide without fusion which comprises heating said oxide to a temperature lower than its melting temperature, passing a hot reducing gas at a temperature between 1650–2000° F., containing endothermic and exothermic components, the latter being CO, substantially free from hydrocarbons, through a bed of particles of the oxide to reduce the greater part of the oxide by gaseous reduction while maintaining the ratio of the endothermic and exothermic components, of the reducing gases so that the step of reduction is exothermic, cooling said reduced oxide with a similar relatively cool reducing gas to deposit sufficient carbon in the mass by the reaction $2CO = CO_2 + C$ for the subsequent reduction in the steelmaking step, and then completing the cooling under non-oxidizing conditions.

7. The process of reducing iron ore without fusion which comprises the following steps: Heating the oxide to a temperature suitable for rapid gaseous reduction without fusion, passing the reducing gas, substantially free from hydrocarbons, at a temperature between 1650–2000° F. through the bed to reduce a major portion of it to metallic iron, said reducing gas containing exothermic and endothermic components, including CO as part of the exothermic gas and $H_2$ as a part of the endothermic gas, maintaining the ratio of the CO and $H_2$ in the gas so that the exothermic heat of reduction by CO will exceed that of the endothermic heat of reduction by $H_2$, cooling the reduced oxide with relatively cool reducing gas similar to said hot reducing gas, being substantially free from $CO_2$ at the point of induction to carburize and partially cool, and further cooling with cooling gas of combustion.

8. The process of reducing iron oxide without fusion, which comprises placing the oxide in a gas permeable bed upon a gas permeable support in a container, and carrying out the several steps necessary for reduction and for placing the reduced metal in a relatively cool condition, suitable for exposure to the air, separately and serially carrying out the following steps without movement of the charge except in the last step for steelmaking; first, heating by downdraft passage through the bed with gas of combustion to a temperature suitable for rapid gaseous reduction, diverting a portion of this gas after passing through the bed for use in the subsequent cooling step; second, passing a hot reducing gas at a temperature between 1650–2000° F. through the bed to effect reduction of the major portion of the oxide by gaseous reduction without fusion, said hot reducing gas containing endothermic and exothermic components, the latter being CO; third, passing relatively cool reducing gas through the bed to cool it and to deposit sufficient carbon for subsequent substantially complete reduction of the remaining unreduced oxide in a steelmaking step by the reaction $2CO = CO_2 + C$; fourth, completing the cooling under non-oxidizing conditions by passing aforesaid unheated gas of combustion through the bed; and fifth, replacing the charge with a fresh charge of oxide for repetition of the steps.

ROBERT D. PIKE.

References Cited in the file of this patent

UNITED STATES PATENTS

| Number | Name | Date |
|---|---|---|
| 1,319,589 | Jones | Oct. 21, 1919 |
| 2,501,189 | Pike | Mar. 21, 1950 |

FOREIGN PATENTS

| Number | Country | Date |
|---|---|---|
| 238,270 | Great Britain | Aug. 14, 1935 |